No. 873,993. PATENTED DEC. 17, 1907.
C. A. CYPHERS.
BROODER.
APPLICATION FILED JAN. 2, 1906.

Witnesses:
L. G. Connelly
Ethel A. Kelly

Inventor:
Charles A. Cyphers
by his attorneys
Macomber & Ellis

UNITED STATES PATENT OFFICE.

CHARLES A. CYPHERS, OF BUFFALO, NEW YORK, ASSIGNOR, BY MESNE ASSIGNMENTS, TO MODEL INCUBATOR COMPANY, OF BUFFALO, NEW YORK, A CORPORATION OF NEW YORK.

BROODER.

No. 873,993.  Specification of Letters Patent.  Patented Dec. 17, 1907.

Application filed January 2, 1906. Serial No. 294,199.

*To all whom it may concern:*

Be it known that I, CHARLES A. CYPHERS, a citizen of the United States, residing at Buffalo, in the county of Erie and State of New York, have invented a new and useful Improvement in Brooders, of which the following is a specification.

My invention relates to brooders; and more particularly to means for heating, ventilating and maintaining the proper temperature in the several parts of the same.

In brooders of the type to which my invention is particularly applicable, there are two general divisions, namely, the nursery and the exercising room. Within the nursery is the hover.

One of the chief difficulties in brooder construction in the past has been to properly warm the nursery without overheating the hover. To secure the best results, the hover temperature should be but a little higher than the general temperature of the nursery. Again, the chickens, when in the brooder, should not be subjected to a strong radiated heat or to a strong flow of highly heated air, since such conditions make them tender and liable to disease. It follows, therefore, that in order to properly heat the nursery without overheating the hover, other means than by heating the nursery from the overflow of heat from the hover must be employed; and this, together with other ends I accomplish in the following manner.

Figure 1:
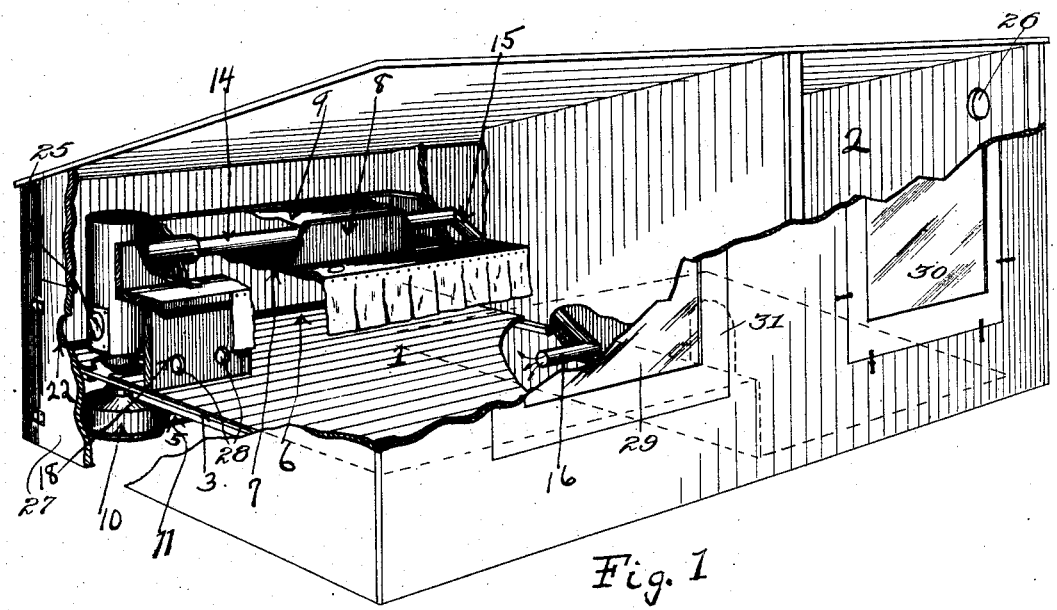
Figure 2:
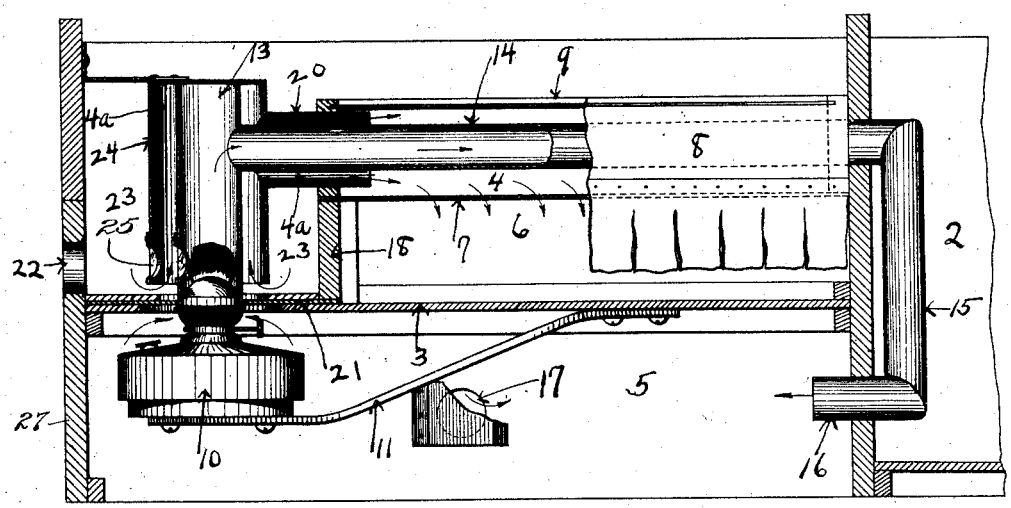

Referring to the drawings herewith, in which like characters of reference refer to like parts, Figure 1 is a perspective of a brooder equipped with my improvements, the parts being cut away to show the internal construction. Fig. 2 is an enlarged vertical section of the nursery and hover showing my improvements more in detail.

The nursery is indicated at 1, and the exercising room at 2. The nursery has an elevated floor 3, the space below forming the lamp chamber 5. The hover 6 is formed in the nursery 1, in the usual manner. The top of the hover is of porous material 7 and a hover heating chamber 4 is formed over the top, having side walls 8 and a solid covering 9. This hover heating chamber extends over the length of the hover.

The heating lamp 10 is supported by a bracket 11 in the lamp chamber 5 which bracket is secured to the under side of the floor 3. The burner of the lamp is fitted to a smoke or waste flue 13 which passes down through the floor 3 and fits tightly at its base through a metal ring 21 attached to the floor so that no products of combustion returning through the waste flue 16 can pass into the fresh air compartments of the heating chamber. The waste flue 13 is closed at its top and connects with a smoke or waste flue 14 which passes through the hover heating chamber 4 over hover 6 and thence into the exercising room 2 through the flue 15 and thence into the lamp chamber 5 through the flue 16 where it discharges the combustion products, which are diffused in said lamp chamber 5 and eventually pass out through opening 17. A door 27 gives access to the lamp, and mica peep-holes 25, in the flues 24 and 13 permit observation of the lamp flame. The brooder has the usual glazed door 29 and the exercising-room has the usual glazed door 30. A jacket 24 is placed around the flue 13 and forms a heating space $4^a$ which is closed at its top and connects with a tube 20 that leads into the hover-heating chamber 4 over the hover 6 and opens therein. Partitions 18 together with the outside walls of the brooder surround the jacket 24 and form a nursery heating chamber 23 from which the freshly heated air which is admitted through the vent 22 and the small openings 28 near the floor passes directly to the nursery. These partitions 18 also serve to keep the chicks from getting into the nursery heating chamber 23. The lower portion of the heating space $4^a$ is open so that it may take the air from the nursery heating chamber 23 which in turn is supplied with fresh air through a vent 22 which leads from the outside air into the nursery heating chamber 23 at a point just above the floor 3.

It will be understood that the brooder is provided with the usual door opening 31 from the nursery to the exercising room as well as openings such as the hole 26 and the door 30 for ventilation in the exercising room.

By means of the construction described the products of combustion are carried through the waste flue 13 and through flues 14, 15 and 16 and are discharged into the lamp chamber 5. The fresh air as it passes through vent 22 into the nursery heating chamber 23 passes, in part, into the heating-space $4^a$ between the flues 13 and 24, is heated, and passing into the chamber 4 is further heated by radiation from the flue 14, spreads out over the chamber 4 and is evenly and gently disseminated downwardly through the porous material 7 into the hover 6. This both warms and ventilates the hover. The movement of the air, however, is slow and even so that the chicks rest comfortably beneath the hover without feeling any drafts. The jacket 24 radiates heat into the nursery heating chamber 23 and thus sets up convection currents which pass over the top of the walls 18 directly into the nursery thereby heating it to nearly as high a temperature as the hover 6. It will thus be seen that the chicks in the hover are not subjected to strong direct radiation of heat or perceptible drafts of air since the air is distributed quite evenly and generally through the porous material 7. It will further be noted that a supply of fresh air is continually carried in to afford a fresh supply of oxygen but at the same time no supply of fresh air which might result in cold drafts can reach the chicks but becomes mixed and tempered with warm air in the nursery heating chamber 23 or in the heating space 4ª before it can either reach the nursery or the hover portions of the brooder.

The lamp burner is so placed that the point of combustion is above the metal plate 21 while the body of the lamp 10 is suspended in the lamp chamber 5 and is thus kept cool while the oil is protected from being over heated.

Having thus described my invention and its method of operation, what I claim is:

1. In a brooder the combination with a nursery of a hover, a source of heat, a nursery heating chamber surrounding said source of heat and leading directly into said nursery, a hover heating chamber extending over the length of the said hover, a perforate heat disseminating body interposed between said hover heating chamber and said hover, a waste flue leading from said source of heat and passing through said hover heating chamber.

2. In a brooder the combination with a nursery and a hover, of a lamp chamber located below the floor of said nursery, a lamp suspended in said lamp chamber and having its point of combustion immediately above the floor of said nursery and a waste flue leading from said lamp over said hover and thence back into said lamp chamber.

3. In a brooder the combination with a nursery and a hover, of a lamp chamber located below the floor of the said nursery, a lamp suspended in said lamp chamber and having its point of combustion immediately above the floor of said nursery, a waste flue leading from said lamp over said hover and thence back into said lamp chamber and means for preventing the products of combustion from reaching either said nursery or said hover.

4. In a brooder the combination with a nursery and a hover, of a lamp chamber located below the floor of said nursery, a lamp suspended in said lamp chamber and having its point of combustion immediately above the floor of said nursery a hover heating chamber extending over the length of said hover, a waste flue leading from said lamp and passing through said hover heating chamber and thence leading to said lamp chamber.

5. In a brooder the combination with a nursery and a hover, of a lamp chamber located below the floor of said nursery, a lamp suspended in said lamp chamber and having its point of combustion immediately above the floor of said nursery, a hover heating chamber, a waste flue leading from said lamp and passing through said hover heating chamber, a heating flue surrounding the portion of the waste-flue from lamp to hover-heating chamber, and a nursery-heating chamber surrounding said last mentioned flue and leading directly into said nursery.

6. In a brooder the combination with a nursery of a hover, an exercising room, a lamp chamber located below the floor of said nursery, a lamp suspended in said lamp chamber and having its point of combustion immediately above the floor of said nursery, a hover heating chamber extending over the length of said hover and a waste flue leading from said lamp and passing through said hover heating chamber, said exercising room, and back into said lamp chamber.

7. In a brooder the combination with a nursery, of a hover, an exercising room, a lamp chamber located below the floor of said nursery, a lamp suspended in said lamp chamber and having its point of combustion immediately above the floor of said nursery, a hover-heating chamber, a waste flue leading from said lamp and passing through said hover heating chamber, said exercising room and back into said lamp chamber, a heating flue surrounding the portion of the waste-flue from lamp to hover-heating chamber, and a nursery-heating chamber surrounding said last-mentioned flue and leading directly into the nursery.

In testimony whereof, I have hereunto set my hand in the presence of two witnesses.

CHARLES A. CYPHERS.

Witnesses:
WILLIAM B. FRYE,
E. A. KELLY.